(12) United States Patent
Bradford et al.

(10) Patent No.: US 11,920,628 B2
(45) Date of Patent: *Mar. 5, 2024

(54) EQUIPMENT MOUNTING SYSTEMS AND PROCESSES THEREOF

(71) Applicant: BRIGHT POWER INC., Napa, CA (US)

(72) Inventors: Andrew John Bradford, Napa, CA (US); Jesse Macgregor Brown, Napa, CA (US); Brian Michael Peterson, Napa, CA (US); Barend Venter, Napa, CA (US)

(73) Assignee: BRIGHT POWER INC., Napa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/881,651

(22) Filed: Aug. 5, 2022

(65) Prior Publication Data

US 2022/0373009 A1    Nov. 24, 2022

Related U.S. Application Data

(63) Continuation of application No. 17/218,429, filed on Mar. 31, 2021, now Pat. No. 11,441,588.

(51) Int. Cl.
*F16B 5/02*       (2006.01)
*F16B 33/00*      (2006.01)
(Continued)

(52) U.S. Cl.
CPC ............... *F16B 5/02* (2013.01); *F16B 39/24* (2013.01); *F16B 33/002* (2013.01);
(Continued)

(58) Field of Classification Search
CPC ............ H02S 20/23–24; F24S 2025/01; F24S 2025/021; F24S 2025/022; F24S 25/40;
(Continued)

(56) References Cited

U.S. PATENT DOCUMENTS

| 295,960 | A | * | 4/1884 | Dusen | ..................... F16B 39/14 411/253 |
| 1,059,420 | A | * | 4/1913 | Worth | ..................... F16B 39/14 411/247 |

(Continued)

*Primary Examiner* — Matthew P Travers
(74) *Attorney, Agent, or Firm* — EcoTech Law Group, P.C.

(57) ABSTRACT

An equipment mounting system for mounting equipment to a support structure is described. An equipment mounting system including: (i) a mounting plate having defined therein a plate aperture of a particular shape; (ii) a bolt having a shaft portion including a threaded portion and a non-threaded portion that is of a complementary shape that complements the particular shape of the plate aperture; and (iii) a washer having defined therein a scored aperture that includes multiple radially extending scorings. In an assembled configuration of the mounting plate, the bolt and the washer, the plate aperture of the particular shape aligns with the scoring aperture such that both of the plate aperture and the scoring aperture receive the non-threaded portion of the complementary shape, and the particular shape of the mounting plate engages with the complementary shape of the bolt to prevent rotational displacement of the bolt around the mounting plate.

14 Claims, 5 Drawing Sheets

(51) Int. Cl.
*F16B 39/24* (2006.01)
*F24S 25/00* (2018.01)
*F24S 25/40* (2018.01)
*F24S 25/60* (2018.01)
*H02S 20/23* (2014.01)

(52) U.S. Cl.
CPC ......... *F16B 33/004* (2013.01); *F24S 2025/01* (2018.05); *F24S 2025/021* (2018.05); *F24S 25/40* (2018.05); *F24S 2025/6005* (2018.05); *H02S 20/23* (2014.12)

(58) Field of Classification Search
CPC ....... F24S 2025/6005; F24S 2025/6006; F24S 2025/601; F16B 39/14; F16B 39/284; F16B 33/002; F16B 39/24; F16B 39/32; F16B 33/004; F16B 5/02
See application file for complete search history.

(56) References Cited

U.S. PATENT DOCUMENTS

| | | | | |
|---|---|---|---|---|
| 1,302,105 A * | 4/1919 | Warren | ................... | F16B 39/14 411/196 |
| 1,788,735 A * | 1/1931 | Olson | ................... | F16B 39/24 470/42 |
| 2,311,299 A * | 2/1943 | Olson | ................... | F16B 39/24 411/134 |
| 3,175,454 A * | 3/1965 | Morse | ................... | F16B 33/004 411/542 |
| 6,283,691 B1* | 9/2001 | Bogatz | ................. | F16B 33/004 411/371.1 |
| 2005/0201844 A1* | 9/2005 | Davies | ................. | F16B 19/008 411/34 |
| 2007/0098520 A1* | 5/2007 | Schraer | ................. | F16B 37/048 411/179 |
| 2011/0305540 A1* | 12/2011 | Litzinger | ............. | F16B 43/001 411/386 |
| 2012/0233958 A1* | 9/2012 | Stearns | ................. | E04G 21/328 52/708 |
| 2013/0031765 A1* | 2/2013 | Lan | ....................... | F16B 33/004 29/428 |
| 2014/0331594 A1* | 11/2014 | Stearns | ................... | E04D 13/10 52/705 |
| 2015/0232692 A1* | 8/2015 | Snyder | ................... | B29B 15/00 411/371.1 |
| 2017/0002567 A1* | 1/2017 | Shevlin | ................... | E04D 5/149 |
| 2017/0016326 A1* | 1/2017 | Van Dyk | ................. | F16B 29/00 |
| 2018/0191290 A1* | 7/2018 | Guthrie | ................. | H01L 31/048 |
| 2018/0238369 A1* | 8/2018 | Perroud | ................. | F16B 33/004 |
| 2020/0400272 A1* | 12/2020 | Patton | ................... | F16M 13/02 |

* cited by examiner

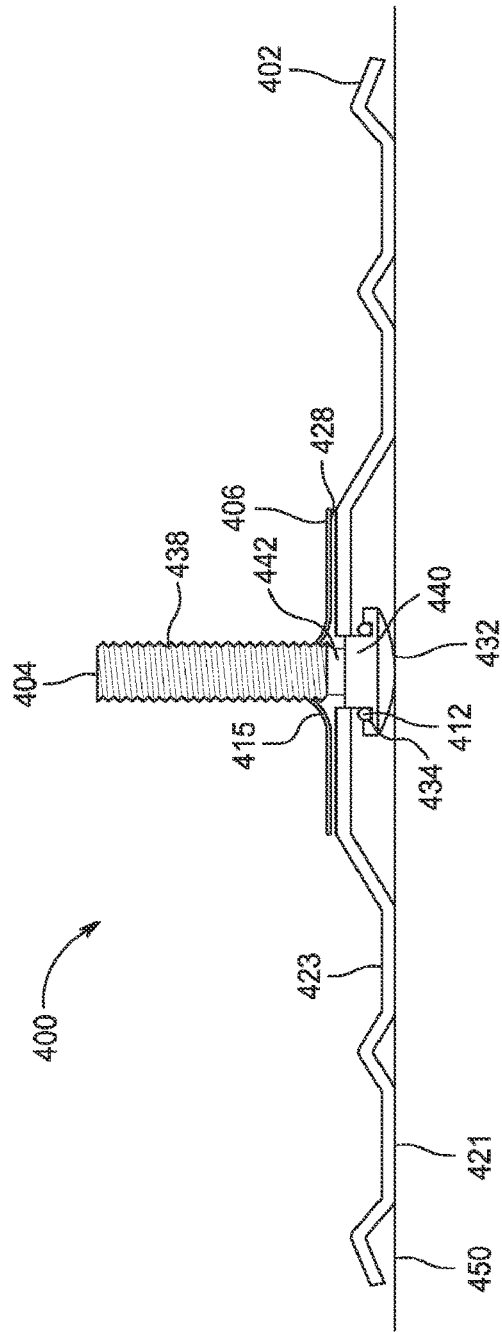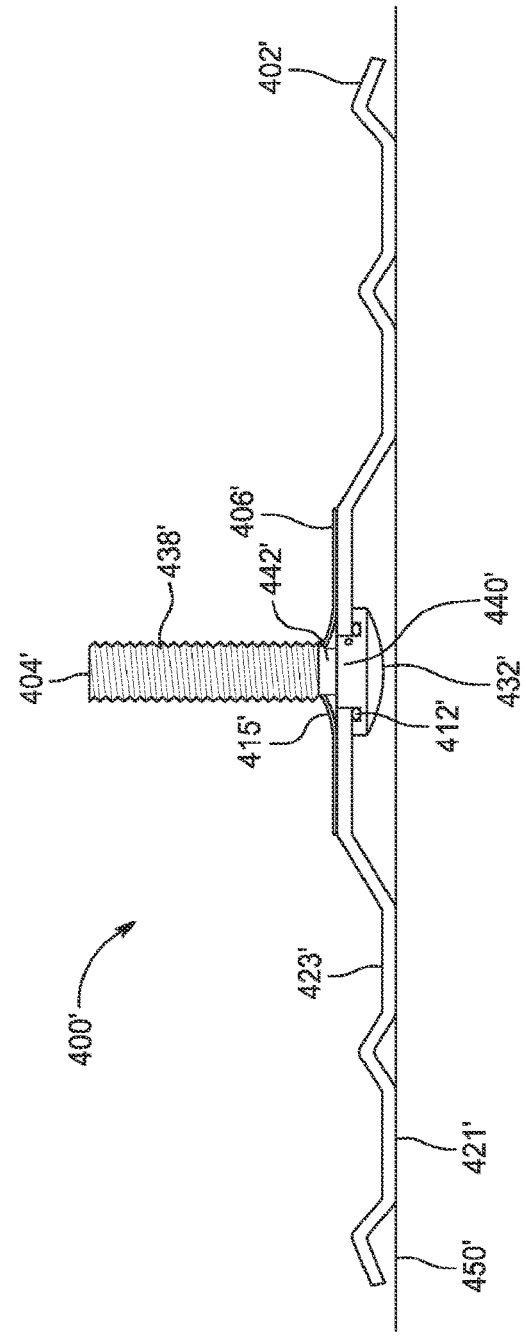

EQUIPMENT MOUNTING SYSTEMS AND PROCESSES THEREOF

RELATED APPLICATION

The present application is a continuation of U.S. patent application Ser. No. 17/218,429 which was filed on 31 Mar. 2021, which is incorporated herein by reference for all purposes.

FIELD

The present teachings generally relate to equipment mounting systems and processes relating thereto. More particularly, the present teachings relate to improved equipment mounting systems and processes that use a mounting plate to secure equipment (e.g., solar modules) to a support structure (e.g., rooftop).

BACKGROUND

Conventional equipment mounting systems use numerous interconnecting components to mount equipment to a support structure. Unfortunately, they are typically heavy and involve a cumbersome assembly process. By way of example, heavy and complicated conventional equipment mounting systems suffer from increased transportation costs and installation costs. To this end, specialized equipment such as lifts or cranes are typically needed to lift components of the module mounting systems from the ground to a support structure typically located high above the ground. Moreover, complicated designs, which require numerous components, prolong the equipment installation process.

What is, therefore, needed are novel solutions for effectively mounting equipment to support structures.

SUMMARY OF THE INVENTION

To this end, the present arrangements and teachings provide improved equipment mounting systems and methods relating thereto. The present equipment mounting systems, among other things, effectively and simply secure equipment to a support structure. In one aspect, the present arrangements provide an improved equipment mounting systems. An exemplar improved equipment mounting system includes: (i) a mounting plate; (ii) a bolt; and (iii) a washer. The mounting plate has defined therein, at or near a center region, a plate aperture of a particular shape. The bolt has a shaft portion including a threaded portion and a non-threaded portion that is of a complementary shape that complements the particular shape of the plate aperture. The washer having defined therein, at or near a center region, a scored aperture that includes multiple radially extending scorings.

In an assembled configuration of the equipment mounting system, the plate aperture of the particular shape aligns with the scoring aperture such that both of the plate aperture and the scoring aperture receive with the non-threaded portion of the complementary shape. Moreover, the particular shape of the mounting plate engages with the complementary shape of the bolt to prevent rotational displacement of the bolt around the mounting plate.

In one implementation of the present arrangements, the washer includes multiple engaging portions, each of which is defined between two radially extending scorings. The multiple engaging portions protrude in one direction, and in the assembled configuration, protrude away from the mounting plate to provide spring loading action towards the plate. In a preferred implementation of the present arrangements, the multiple engaging portions engage with the bolt to prevent translational displacement of the bolt relative to the mounting plate.

Both surfaces of the washer, in one embodiment of the present arrangements, have applied thereon an adhesive that serves as a substantially water-proof seal. In the assembled configuration, a first surface of the washer adheres to a second surface of the mounting plate. The adhesive of the second surface of the washer is designed to adhere to a top surface of a sealing patch.

In another embodiment of the present arrangements, a second sealing washer surrounds a shaft portion of the bolt and is adjacent to a bottom surface of the sealing patch. A first adhesive layer secures a first surface of the second sealing washer to the sealing patch and a second adhesive layer secures a second surface of the second sealing washer to the mounting plate.

The bolt, in one embodiment of the present arrangements, includes a sealing groove designed to receive a sealing ring, and in the assembled configuration, the sealing ring seals an underside surface of the mounting plate. Moreover, in the assembled configuration, the sealing ring contacts and is compressed by presence of a first surface of the mounting plate.

In another aspect, the present arrangements provide an improved bolt. The bolt includes a head portion and a shaft portion. The bold head portion includes a protruding region and an underside region. The underside region has defined therein a sealing groove that is designed to receive a sealing ring. The shaft portion connects to the head portion, and the shaft portion has a threaded portion and a non-threaded portion that is of a complementary shape. In an assembled configuration, the bolt engages with a mating component such that the complementary shape of the bolt complements and engages with a particular shape of the mating component to prevent rotational displacement of the bolt relative to the mating component.

In one implementation of the present arrangements, the sealing ring is an o-ring. In another implementation of the present arrangements, the non-threaded portion includes a complementary shape that is a substantially square shape and another shape that is substantially circular.

In another aspect, the present teachings also provide methods of assembling an equipment mounting system. In one exemplar implementation of the present teachings, the method, among other salient steps, includes: (i) obtaining a bolt including a head portion and a shaft portion. The head portion has a protruding region and an underside region, which has defined therein a sealing groove that is designed to receive a sealing ring. The shaft portion, which connects to the head portion, has a threaded portion and a non-threaded portion that is of a complementary shape.

Other salient steps in the above-mentioned method includes: (ii) installing a sealing ring inside the sealing groove to form a sealing bolt; (iii) inserting the sealing bolt through a plate aperture of a particular shape defined at or near a center region of a mounting plate such that the sealing ring contacts a first surface of the mounting plate; (iv) obtaining a washer having defined therein, at or near a center region, an aperture having multiple radially extending scorings; (v) engaging the aperture with the bolt such that the multiple engaging portions of the washer, each of which is defined between two radially extending scorings, protrude away from the mounting plate; and (vi) applying a force that drives the washer towards a non-threaded portion of the bolt to provide spring loading action towards the mounting plate and compresses the sealing ring against a first surface of the mounting plate.

The construction and method of operation of the present teachings and arrangements, however, together with additional objects and advantages thereof, will be best understood from the following descriptions of specific embodiments when read in connection with the accompanying figures.

BRIEF DESCRIPTION OF THE DRAWINGS

FIG. 4A shows a cross-section view of an equipment mounting system, according to one embodiment of the present arrangements, in a partially assembled state and wherein the washer is not engaged with a non-threaded portion of the bolt.

FIG. 4B shows a cross-section view of the equipment mounting system of FIG. 4A in an assembled state and wherein the washer is engaged with a non-threaded portion of the bolt.

DETAILED DESCRIPTION OF THE DRAWINGS

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

The present teachings and arrangements provide improved equipment mounting systems and processes relating thereto that are discussed in greater detail below. The equipment mounting systems facilitate, among other things, an ability to transport, to an installation site, various components of the equipment mounting system in an unassembled state. These components may then be quickly and easily assembled to form the mounting equipment assembly and to a support structure. Transportation of an unassembled equipment mounting system reduces shipping cost as more components may be transported in a finite amount of space than fully assembled equipment mounting systems. Moreover, during operational use of the equipment mounting systems, a damaged component may be replaced with new components, thus increasing an overall lifespan of the equipment mounting system.

Additionally, the equipment mounting systems minimizes transmission of moisture, though the equipment mounting systems, to the support structure, which may result in severe damages and costly repairs to the support structure. By way of example, the equipment mounting system utilizes sealing rings to prevent transmission of moisture between components of the mounting equipment assembly when it is fully assembled.

Figure 1:
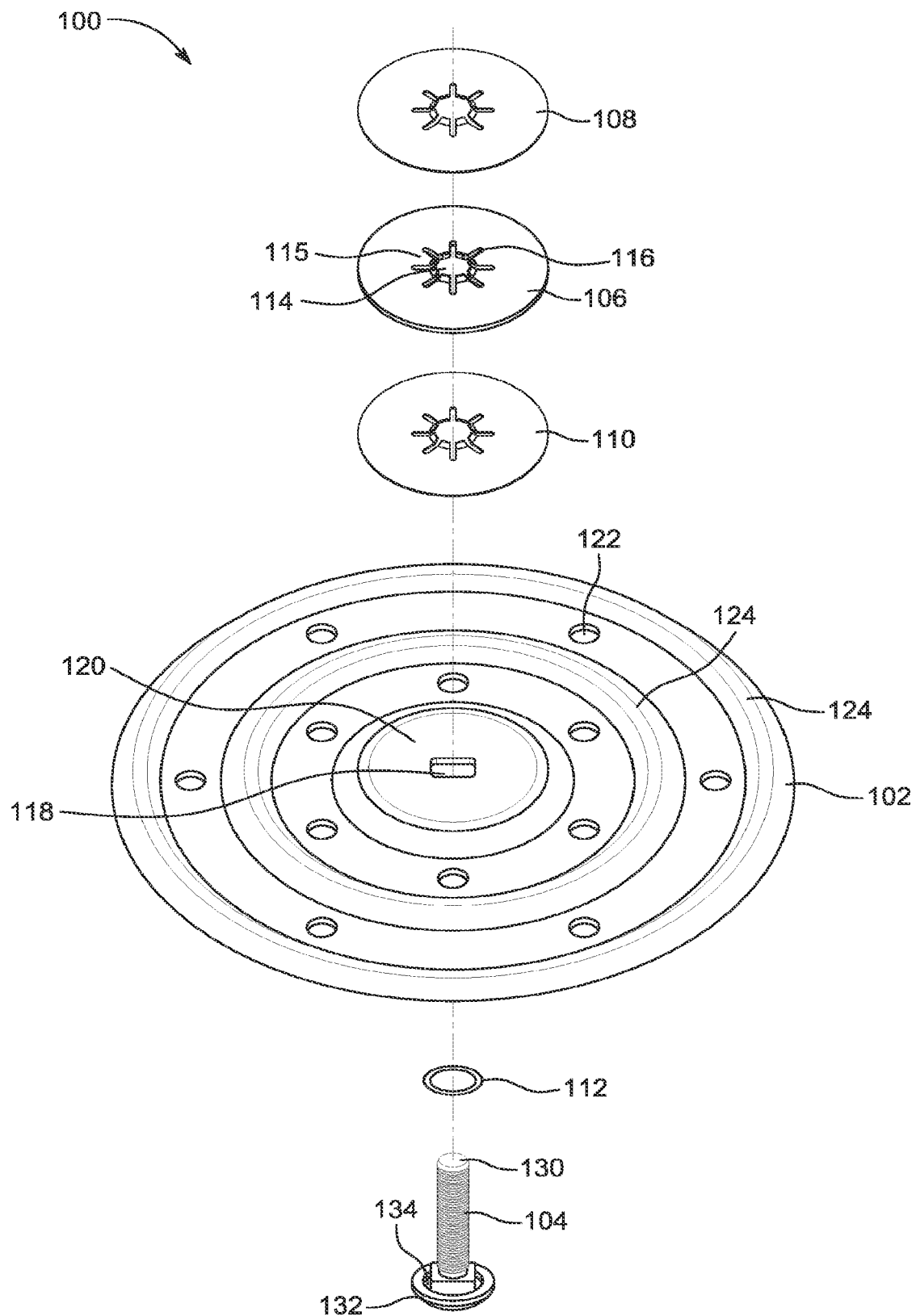
FIG. 1 shows an exploded view of an equipment mounting system, according to one embodiment of the present arrangements, that couples to a support structure, such as a rooftop, on one side and couples to equipment on another side, and wherein the equipment mounting system includes a bolt, a mounting plate, and a washer.

FIG. 1 shows an equipment mounting system 100, according to one embodiment of the present teaching, which includes a mounting plate 102, a bolt 104, and a washer 106. Bolt 104 includes a shaft portion 130 and a head portion 132.

Mounting plate 102 has defined therein a plate aperture 118, a raised center region 120, one or more securing apertures 122, and one or more raised concentric regions 124. Plate aperture 118 is defined at or near a center region of mounting plate 102. In a preferred embodiment of the present arrangements, plate aperture 118 is an aperture of a particular shape (hereafter also referred to as a "plate aperture of a particular shape"). In a more preferred embodiment of the present arrangements, the shape is a quadrupedal.

Moreover, plate aperture 118, as shown in FIG. 1, is defined in a raised center region 120. Raised center region 120 forms a cavity on an underside of mounting plate 102 and, in an assembled configuration, a least some of shaft portion 130 of bolt 104 protrudes through plate aperture 118 and head portion 132 of bolt 104 resides in the cavity on the underside of mounting plate 102.

In a preferred embodiment of the present arrangements, mounting plate 102 is substantially circular and includes one or more raised concentric regions 124 to provide rigidity to mounting plate 102. Presence of one or more raised concentric regions 124 inhibits mounting plate 102 from flexing during installation and operation of equipment mounting system 100.

Figure 5:
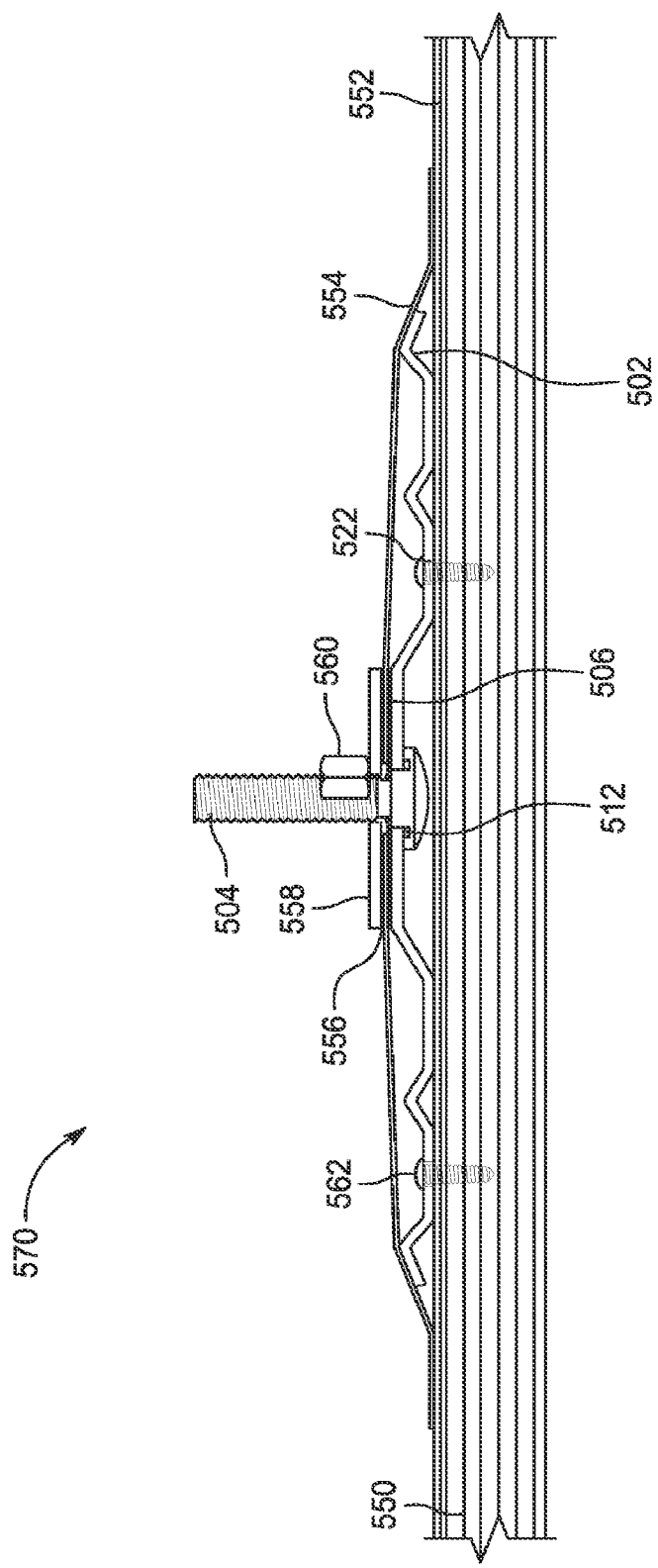
FIG. 5 shows a cross-sectional view of an assembled equipment mounting system, according to one embodiment of the present arrangements, that is secured to a support structure and provides a moisture impermeable barrier.

In another preferred embodiment of the present arrangements, mounting plate 102 includes one or more securing apertures 122 to facilitate securing mounting plate 102 to a support structure (e.g., support structure 550 of FIG. 5. In an assembled state of equipment mounting system 100, a fastener (e.g., a screw, nail, or bolt) extends through at least one of one or more securing apertures 122 and into the support structure to secure mounting plate 102 to the support structure.

Mounting plate 102 is made from at least one material selected from a group comprising: stainless steel, steel, titanium, bronze, copper, polyvinyl chloride ("PVC"), high-density polyethylene ("HDPE"), polypropylene, acrylonitrile butadiene styrene ("ABS"), acetal, plastic, wood, glass fiber and resin. In a preferred embodiment of the present arrangements, mounting plate is made from stainless steel.

Regardless of the shape and dimensions involved in making mounting plate 102, Shaft portion 130 of bolt 104 extends through a plate aperture 118 of mounting plate 102 and a scored aperture of washer 106. Moreover, mounting plate 102 is preferably sandwiched between a head portion 132 of bolt 104 and washer 106.

Extending shaft portion 130, in one embodiment of the present arrangements, extends from head portion 132. An underside region (e.g., underside region 244 of FIG. 2) of head portion 132 includes a sealing groove 134, which is designed to receive a sealing ring 112. Bolt 104 with sealing ring 112 installed inside sealing groove 134 is also referred to as a sealing bolt. In an assembled configuration of equipment mounting system 100, sealing ring 112 provides a seal between mounting plate 102 and bolt 104.

Washer 106, in one embodiment of the present arrangements, includes multiple extending scores 116 surround scored aperture 114 and radially extend into washer 106. An engaging portion 115 of washer 106 is defined between two adjacent extending scores 116 and, in an assembled state of equipment mounting system 100, engages with a shaft portion 130 of bolt 104. In a preferred embodiment of the present arrangements, washer 106 includes multiple engaging portions 115 and, as will be described in greater detail below, the engagement between shaft portion 130 of bolt 104 and multiple engaging portions 115 prevent translation displacement of bolt 104 relative to mounting plate 102.

Washer 106 is made from at least one material selected from a group comprising: spring steel, steel, stainless steel, copper aluminum, titanium, iron, bronze, zinc, copper, PVC, nylon, HDPE, polypropylene, ABS, and acetal. In a preferred embodiment of the present arrangements, washer 106 is made from spring steel.

In a preferred embodiment of the present teachings, an adhesive is applied to one or both surfaces of washer 106. A first adhesive layer 108, which is applied to a first washer surface (e.g., first washer surface 326 of FIG. 3) of washer 106, secures washer 106 to another installation component (e.g., sealing patch 554 of FIG. 5) that is adjacent to washer 106. A second adhesive layer 110, which is applied to a second washer surface (e.g., second washer surface 328 of FIG. 3) of washer 106, secures washer 106 to mounting plate 102. Moreover, first adhesive layer 108 and/or a second adhesive layer 110 substantially reduce or eliminate water or fluid penetration between washer 106 and mounting plate 102 and washer 106 and another component, respectively.

Figure 2:
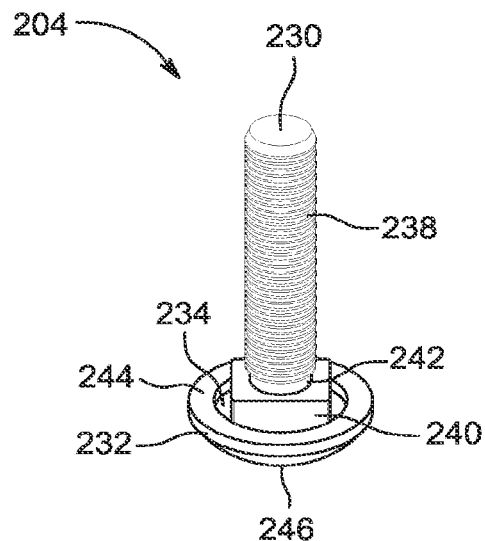
FIG. 2 shows an isometric view of the bolt shown in FIG. 1.

FIG. 2 shows a bolt 204, according to one embodiment of the present arrangements, and that is substantially similar to bolt 104 of FIG. 1. Bolt 204 includes a shaft portion 230, a head portion 232, and a sealing groove 234 which are substantially similar to their counterparts in FIG. 1 (i.e., shaft portion 130, a head portion 132, and a sealing groove 134). Head portion 232 includes an underside region 244 and a protruding region 246 that extends a distance from underside region 244. Additionally, underside region 244 has defined therein a sealing groove 234 that is designed to receive a sealing ring.

Shaft portion 230 extends from head portion 232 and includes a threaded portion 238, a non-threaded portion of a complementary shape 240 and a non-threaded portion of another shape 242. Shaft portion 230 extends from underside region 244. A length of shaft portion 230, in accordance with one embodiment of the present arrangements, has a value that ranges between about 0.25 inches and about 6 inches, in a preferred embodiment of the present arrangements, has a value that ranges between about 0.5 inches and about 4 inches, and, in a more preferred embodiment of the present arrangements, has a value that ranges between about 1 inch and about 2.5 inches.

The non-threaded portion includes a non-threaded portion of a complementary shape 240 and a non-threaded portion of another shape 242. Non-threaded portion of a complementary shape 240 extends an extending distance from underside region 244. The extending distance of non-threaded portion of a complementary shape 240, one embodiment of the present arrangements, has a value that ranges between about 0.05 inches and about 0.5 inches. In a preferred embodiment of the present arrangements, the extending distance has a value that ranges between about 0.05 inches and about 0.25 inches, and, in a more preferred embodiment of the present arrangements, the extending distance has a value that ranges between about 0.1 inches and about 0.15 inches.

Non-threaded portion of a complementary shape 240 is a shape that is substantially similar to a plate aperture a particular shape (e.g., plate aperture of a particular shape 118 of FIG. 1). In other words, the particular shape of the mounting plate aperture is substantially similar and complementary to non-threaded portion of a complementary shape 240. In an assembled configuration of the equipment mounting system (equipment mounting system 100 of FIG. 1), the particular shape of the mounting plate aperture engages with non-threaded portion of a complementary shape 240 to prevent rotational displacement of bolt 104 around the mounting plate. In a preferred embodiment of the present arrangements, the shape of non-threaded portion of a complementary shape 240 is a quadrupedal.

Non-threaded portion of another shape 242 extends an extending distance from non-threaded portion of a complementary shape 240. The extending distance of non-threaded portion of another shape 242, one embodiment of the present arrangements, has a value that ranges between about 0.01 inches and about 0.25 inches. In a preferred embodiment of the present arrangements, the extending distance of non-threaded portion of another shape 242 has a value that ranges from about 0.01 inches to about 0.65 inches, and, in a more preferred embodiment of the present arrangements, has a value that ranges from about 0.02 inches to about 0.04 inches. Preferably, the extending distance of non-threaded portion of another shape 242 is greater than a thickness of the washer (e.g., washer 106 of FIG. 1).

Non-threaded portion of another shape 242, in one aspect of the present arrangements, has a diameter that is less than a major diameter (i.e., the largest diameter of a bolt thread) of threaded portion 238. The diameter of non-threaded portion of another shape 242, in one embodiment of the present arrangements, has a value that ranges between about 0.125 inches and about 1 inch. In preferred embodiment of the present arrangements, the diameter of non-threaded portion of another shape 242 has a value that ranges between about 0.25 inches and about 0.5 inches, and, in a more preferred embodiment of the present arrangements, ranges between about 0.25 inches and about 0.45 inches.

Threaded portion 238 extends from non-threaded portion of another shape 242. The length of threaded portion 238, one embodiment of the present arrangements, has a value that ranges between about 0.25 inches and about 6 inches. In a preferred embodiment of the present arrangements, the length of threaded portion 238 has a value that ranges between about 0.5 inches and about 4. In a more preferred embodiment of the present arrangements, the length of threaded portion 238 has a value that ranges between about 1 inch and about 2.5 inches.

A major diameter of threaded portion 238, in a preferred embodiment of the present arrangements, is greater than a diameter of scored aperture of a washer (e.g., scored aperture 114 of washer 106 of FIG. 1). The major diameter of threaded portion 238, in one embodiment of the present arrangements, has a value that ranges between about 0.125 inches and about 1 inch. In a preferred embodiment of the present arrangements, the major diameter of threaded portion 238 has a value that ranges between about 0.25 inches about 0.75 inches. In a more preferred embodiment of the present arrangements, the major diameter of threaded portion 238 has a value that ranges between about 0.375 inches and about 0.5 inches.

Figure 3:
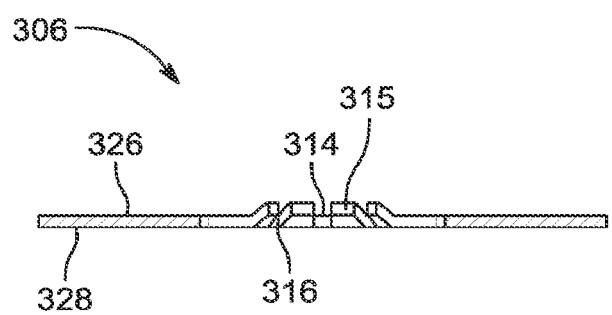
FIG. 3 shows a cross-sectional view of the washer shown in FIG. 1.

FIG. 3 shows a cross section of a washer 306, according to one embodiment of the present arrangements, and that is substantially similar to washer 106 of FIG. 1. Washer 306 has defined therein scored aperture 314, and includes an engaging portion 315, and a radially extending score 316, each of which are substantially similar to their counterparts in FIG. 1 (i.e., scored aperture 114, engaging portion 115, and radially extending scores 116.) Washer 306 further includes a first washer surface 326 and a second washer surface 328. As discussed above, in one embodiment of the present arrangements, second washer surface 328 is adjacent to a mounting plate (e.g., mounting plate 102 of FIG. 1) and first washer surface 326 is adjacent another installation component (e.g., sealing patch 554 of FIG. 5).

A diameter of scored aperture 314, in a preferred implementation of the present arrangements, is less than the diameter of a threaded portion (e.g., threaded portion 238 of FIG. 2) of a bolt (e.g., bolt 204 of FIG. 2) and less than a diameter of a non-threaded portion of another shape (e.g., non-threaded portion of another shape 242 of FIG. 2) of the bolt. The diameter of scored aperture 314, in one embodiment of the present arrangements, has value that ranges between about 0.1 inches and about 0.99 inches. In a preferred embodiment of the present arrangements, the diameter of scored aperture 314 has a value that ranges between about 0.2 inches and about 0.73 inches. In a more preferred embodiment of the present arrangements, the diameter of scored aperture 314 has a value that ranges between about 0.33 inches and about 0.475 inches.

Each end of engaging portion 315 that is adjacent to scored aperture 314, in one aspect of the present arrangements, is angled or bent away from washer 306. In a preferred embodiment of the present arrangements, the bent end of engaging portion 315 is bent away from second washer surface 328 and towards first washer surface 326. In other words, that a bend angle, between first washer surface 326 and engaging portion 315, is less than a bend angle, between second washer surface 328 and engaging portion 315.

When a threaded portion (e.g., threaded portion 238 of FIG. 2) of a bolt is pushed through scored aperture 314 the bolt enters scored aperture 314 from second washer surface 328. As the threaded portion of the bolt contacts scored aperture 314, the bent end of engaging portion 315 allows the bolt to more easily traverse through scored aperture 314 and not engage in each gap defined between adjacent threads.

In one embodiment of the present teachings, washer 306 has a curved shape, wherein a center region of washer 306, i.e., a location of scored aperture 314, is elevated relative to an exterior edge of washer 306. In this embodiment, washer 306 acts as a spring and generates a restoring force, or spring force, if the elevated portion of washer 306 is compressed. The restoring force is a force that returns a washer 306 to its equilibrium after it has been displaced or deflected. By way of example, if a downward force of a sufficient quantity is applied to the center region of washer 306, the center region of washer 306 will deflect until washer 306 is relatively flat, that is the center region and the edges of washer 306 reside on substantially the same plane. When the force is removed, the restoring force washer 308 returns washer 306 to a conical shape. The restoring force of washer 306 with a conical shape translationally displaces or moves a bolt that is engaged with engaging portion 315, in vertical direction.

FIGS. 4A and 4B shows a cross-section of an equipment mounting system 400 in a partially assembled state (hereinafter also referred to as a "partially assembled equipment mounting system") and equipment mounting system 400' an assembled state (hereinafter also referred to as a "assembled equipment mounting system"). Partially assembled equipment mounting system 400 includes a sealing ring 412 is not compressed, whereas, sealing ring 412' of assembled equipment mounting system 400' is compressed and provides a watertight seal.

Partially assembled equipment mounting system 400 and assembled equipment mounting system 400' of FIGS. 4A and 4B, respectively, are substantially similar to equipment mounting system 100 of FIG. 1. Partially assembled equipment mounting system 400 and assembled equipment mounting system 400' include a mounting plate 402 and 402', a bolt 404 and 404', a washer 406 and 406', and sealing ring 412 and 412', are which are substantially similar to their counterparts in FIG. 1 (i.e., mounting plate 102, bolt 104, washer 106, and sealing ring 112, respectively).

In partially assembled equipment mounting system 400, mounting plate 402 is adjacent to a support structure 450 such that a first mounting plate surface 421 contacts support structure 450. A head portion of bolt 404 also contacts support structure 450 and at least a portion of bolt 404 protrudes through a plate aperture of a particular shape (e.g., plate aperture of a particular shape 118 of FIG. 1). In a preferred embodiment of the present arrangements, threaded portion 438 and at least some of non-threaded portion of another shape 442 extend beyond second mounting plate surface 423 when bolt 404 protrudes through the plate aperture of a particular shape. To this end, equipment (e.g., a solar module) may be secured to threaded portion 438.

A scored aperture (e.g., scored aperture 114 of FIG. 1) of washer 406 surrounds threaded portion 438 of bolt 404. An engaging portion 415 of washer 406 is deflected by presence of threaded portion 438. The deflection of engaging portion 415 increases a diameter of the scored aperture to allow receipt of threaded portion 438 and reduce a resisting force as washer 406 over threaded portion 438. Additionally, a second washer surface 428, in partially assembled equipment mounting system 400, is not in contact with second mounting plate surface 423.

Sealing ring 412, in one embodiment on the present arrangements, is installed in sealing groove 434 but is not in contact with a first mounting plate surface 421. Therefore, sealing ring 412 does not function as a seal between mounting plate 402 and bolt 404. In another embodiment of the present teachings, however, sealing ring 412 contacts first mounting plate surface 421 but is not compressed between first mounting plate surface 421 and sealing groove 434. By way of example, when bolt 404 is inserted through mounting plate 402 and head portion 432 contacts support structure 450, an installed sealing ring 412 contacts, but is not compressed by, first mounting plate surface 421. The uncompressed sealing ring 412, in partially assembled equipment mounting system 400, does not form a substantially waterproof seal between mounting plate 402 and bolt 404.

A head portion 432 (of bolt 404), in one aspect of the present arrangements, is disposed within a cavity defined inside a first mounting plate surface 421 and support structure 450. Preferably, the cavity has defined therein an allowable space for all of head portion 432 and head portion 432 does not extend beyond a plane defined by a first mounting plate surface 421. In other words, when bolt 404 is inserted through mounting plate 402 and mounting plate 402 is placed on support structure 450, the cavity prevents bolt 404 from obstructing contact between support structure 450 and first mounting plate surface 421. Thus, at least a portion of support structure 450 contacts and supports mounting plate 402.

Additionally, another preferred embodiment of the present arrangements, at least a portion of a non-threaded portion of a complementary shape 440 of bolt 404 engages with the plate aperture of the particular shape. In an engaged state, bolt 404 is unable rotate in a rotational manner. Thus, additional installation components may be threaded onto threaded portion 438 without bolt 404 rotating simultaneously.

In assembled equipment mounting system 400', shown in FIG. 4B, the scored aperture of washer 406' surrounds non threaded portion of another shape 442' of bolt 404'. A portion of a second washer surface 438' contacts second mounting plate surface 423'. Engaging portion 415' of washer 406', however, does not contact second mounting plate surface 423'. Rather, engaging portion 415' engages with and is deflected by non-threaded portion of another shape 442'. In one embodiment of the present arrangements, engaging portion 415' contacts an intersection of non-threaded portion of another shape 442' and threaded portion 438'.

As will be discussed in greater detail below (i.e., step 612 of FIG. 6), to enable compression of sealing ring 412', washer 406' directs a lateral force, or spring force, on bolt 404'. The lateral force on bolt 404' compresses sealing ring 412' between sealing groove 434' and first mounting plate surface 421' to create a substantially water-proof barrier or seal between bolt 404' and first mounting plate surface 421' Additionally, where head portion 432' was in contact with support structure 450' in a partially assembled equipment mounting system (e.g., partially assembled equipment mounting system 400 of FIG. 4A), in an assembled state, the lateral force raises head portion 432' from support structure 450'.

In addition to the lateral force to compress sealing ring 412', engagement between engaging portion 415' and non-threaded portion of another shape 442' inhibits lateral movement, in either direction, of bolt 404 relative to mounting plate 402'. Moreover, non-threaded portion of a complementary shape 440' of bolt 404', in assembled equipment mounting system 400', engages with a plate aperture of a particular shape (e.g., plate aperture of a particular shape 118 of FIG. 1) to inhibit horizontal movement of bolt 404' relative to mounting plate 402'. Thus, bolt 404', in assembled equipment mounting system 400', is inhibited from moving in both a laterally and horizontally.

FIG. 5 shows an equipment mounting system 570, according to one embodiment of the present arrangements, that is secured to a support structure 550. Equipment mounting system 570 includes an assembled equipment mounting system 500, which is substantially similar to assembled equipment mounting system 400' in FIG. 4B. In particular, a mounting plate 502, a bolt 504, a washer 506, and sealing ring 512 of assembled equipment mounting system 500 are substantially similar to mounting plate 402', bolt 404', washer 406', and sealing ring 412' of assembled equipment mounting system 400', respectively.

One or more securing fasteners 562, each disposed through a securing aperture 522 and secured to support structure 550, fasten assembled equipment mounting system 500 to support structure 550. In a preferred embodiment of the present arrangements, a support structure membrane 552 is disposed between support structure 550 and mounting plate 502 of an assembled equipment mounting system to protect and/or a provide a water-proof barrier for support structure 550.

In a preferred embodiment of the present arrangements, equipment mounting system 570 includes sealing patch 554, which substantially covers assembled equipment mounting system 400, to provide another water-proof barrier. Sealing patch 554 extends beyond an exterior edge of mounting plate 502 and includes a bolt aperture through which bolt 504 protrudes. Preferably, a portion of sealing patch 554 is disposed adjacent to and contacts at least a portion of washer 506 and a portion mounting plate 502. A portion of sealing patch 554 that extend beyond the exterior edge of mounting plate 502 is secured to support structure 550 and/or support structure membrane 552. Preferably, sealing patch 554 is secured to support structure 550 and/or support structure membrane 552 using an adhesive.

To provide a water-proof barrier around bolt 504, a sealing washer 556 surrounds a shaft portion (e.g., shaft portion 230 of FIG. 2) of bolt 504 and is adjacent to top surface of sealing patch 554. A securing washer 558 is placed adjacent to sealing washer 556 such that sealing washer 556 is sandwiched between the top surface of sealing patch 554 and securing washer 558. Further, a securing nut 560 is threaded onto a threaded portion (e.g., threaded portion 238 of FIG. 2) of bolt 504 to apply a sealing force or load to securing washer 558, which is transferred to sealing washer 556. Thus, sealing washer 556, which is sandwiched between the top surface of sealing patch 554 and securing washer 558 and under a load, inhibits transmission of moisture between sealing washer 556 and bolt 504 and also between sealing washer 556 and sealing patch 554.

In another embodiment of the present arrangements, a second sealing washer surround the shaft portion of bolt 504 and is adjacent to a bottom surface of sealing patch 554. A first adhesive layer secures a first surface of the second sealing washer to sealing patch 554 and a second adhesive layer secures a second surface of the second sealing washer to mounting plate 502. The second sealing washer further reduces or eliminates water or fluid penetration between bolt 504 and sealing patch 554.

Figure 6:
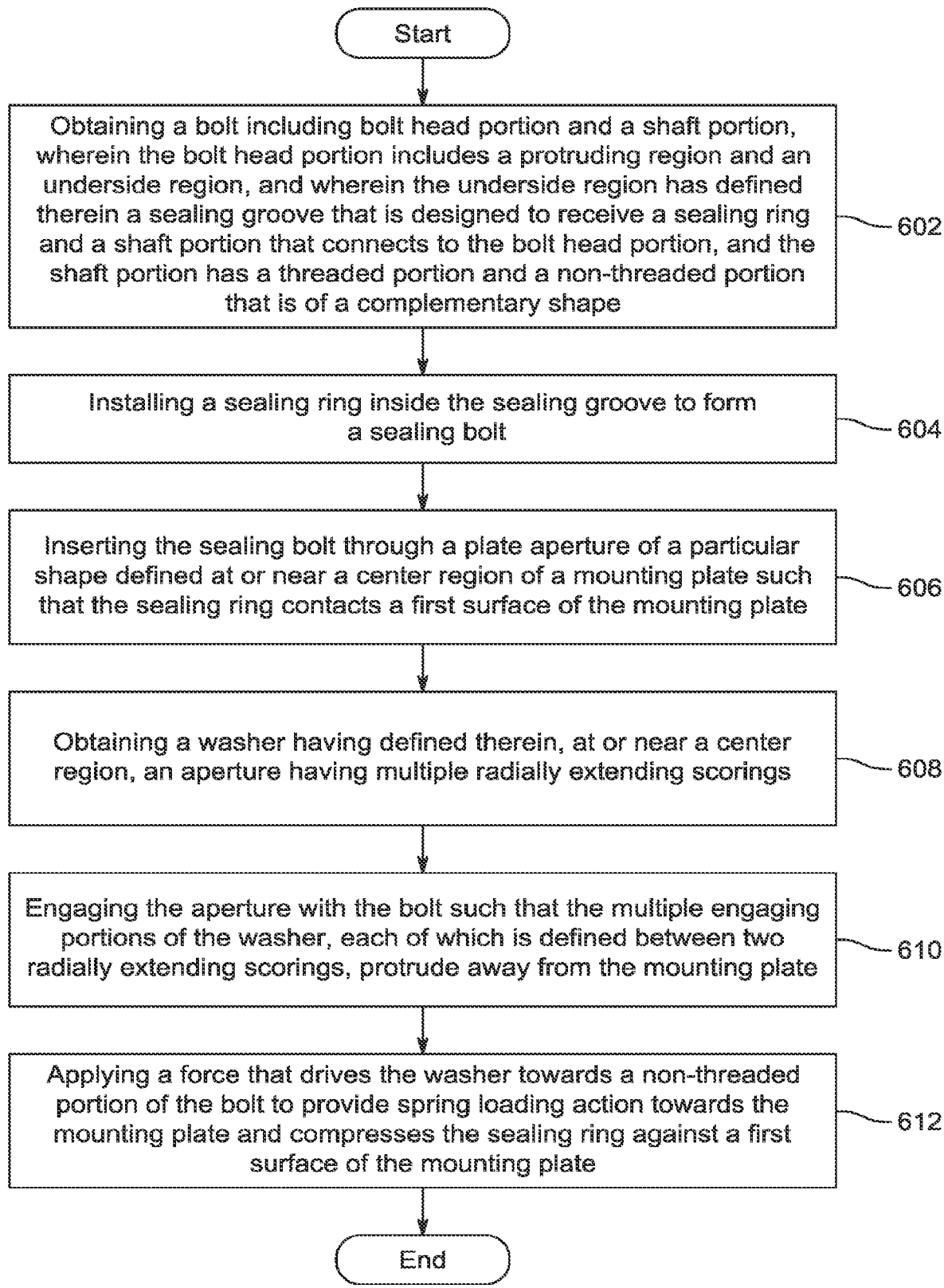
FIG. 6 shows a process flow diagram of a method, according to one embodiment of the present teachings, of assembling an equipment mounting system.

The present teachings offer, among other things, different methods of assembling an equipment installation assembly. FIG. 6 shows a method of assembling an equipment installation assembly, according to one embodiment of the present teachings. Method 600 includes a step 602, which includes obtaining a bolt (e.g., bolt 104 of FIG. 1). In a preferred embodiment to the present teachings, the bolt includes a head portion (e.g., head portion 132 of FIG. 1) and a shaft portion (e.g., shaft portion 130 of FIG. 1). The head portion includes a protruding region (e.g., protruding region 246 of FIG. 2) and an underside region (e.g., underside region 244 of FIG. 2). The underside region has defined therein a sealing groove (e.g., sealing groove 234 of FIG. 2) that is designed to receive a sealing ring (e.g., sealing ring 112 of FIG. 1). The shaft portion connects to the head portion and has a threaded portion (e.g., threaded portion 238 of FIG. 2) and a non-threaded portion that is of a complementary shape (e.g., non-threaded portion of a complementary shape 240 of FIG. 2) to the plate aperture.

Next, a step 604 includes installing a sealing ring (e.g., sealing ring 112 of FIG. 1) inside the sealing groove to form a sealing bolt.

Then the process proceeds to step 606. This step 606 involves inserting the sealing bolt through a plate aperture of a particular shape (e.g., plate aperture of a particular shape 118 of FIG. 1) defined at or near a center region of a mounting plate (e.g., mounting plate 102 of FIG. 1) such that the sealing ring contacts a first mounting plate surface (e.g., first mounting plate surface 421 of FIG. 4A). In a preferred embodiment of the present teachings, the bolt's non-threaded portion of a complementary shape engages with the plate aperture of a particular shape. Thus, the bolt is prevented from rotating within plate aperture of a particular shape and from moving in a translational or horizontal direction.

Following step 606, a step 608 is implemented and includes obtaining a washer (e.g., washer 106 of FIG. 1) having defined therein, at or near a center region, an aperture (e.g., scored aperture 114 of FIG. 1) having multiple radially extending scores (e.g., extending scores 116 of FIG. 1). In a preferred embodiment of the present teachings, step 608 includes a step of applying an adhesive to each washer surface (e.g., first washer surface 326 and second washer surface 328 of FIG. 3).

Next, a step 610 includes engaging the washer aperture with the bolt such that multiple engaging portions (e.g., engaging portion 115 of FIG. 1) of the washer, each of which is defined between two radially extending scorings, protrude away from the mounting plate. As discussed above, in one embodiment of the present teachings, a diameter of the washer aperture is less than a major diameter of the threaded portion and the non-threaded portion of another shape. As shown in FIG. 4A, when the washer aperture is engaged with the bolt, multiple engaging portions of the washer deflect away from the threaded portion and the non-threaded portion of another shape and protrude away from the mounting plate.

A step 612 includes applying a force that drives the washer towards a non-threaded portion (e.g., non-threaded portion of another shape 242 of FIG. 2) of the bolt. The force against the washer generates, within the washer, a spring loading action towards the mounting plate and compresses the sealing ring against a first surface of the mounting plate. In a preferred embodiment of the present teachings, the force is a lateral force and is applied substantially uniformly along a diameter of the washer and against the first washer surface.

By way of example, a tool, having a length of a hollow cylinder, may be used to apply the force. The hollow portion or cavity within the tool is placed over the bolt, such that the bolt is disposed within the hollow portion of the hollow cylinder, until an end of the hollow cylinder is adjacent to the first washer surface. A lateral force, applied by the hollow cylinder, against the first washer surface pushes the washer from a threaded portion of the bolt to the non-threaded portion of another shape. Furthermore, the lateral force pushes the second washer surface against the second mounting plate surface (e.g., second mounting plate surface 423 of FIG. 4A) such that a portion of the second washer surface contacts the second mounting plate surface.

In receiving a diameter of non-threaded portion of another shape, the multiple engaging portions of the washer deflect away from the mounting plate. The deflection of the multiple engaging portions causes a portion of the second washer surface to deflect in an opposing direction. However, contact between the second washer surface and the second mounting plate surface prevents the washer from deflecting. Rather, the washer generates a deflecting force or spring load against the second mounting plate surface. The deflecting force pulls a head portion (e.g., head portion 232 of FIG. 2) the bolt towards the first mounting plate surface, which compresses the sealing ring.

Furthermore, in an embodiment of the present teachings that utilize a conical washer, the lateral force at least partially displaces the conical washer and generates a lateral restoring force or spring force in the conical washer. Recall that when the lateral force is removed, the lateral restoring force returns the conical washer to an equilibrium position. The washer, which is engaged with the bolt, transfers the lateral restoring force to bolt. When the lateral force is removed, the lateral restoring force acting on the bolt compresses the sealing ring against the first mounting plate surface.

Although illustrative embodiments of the present teachings and arrangements are shown and described in terms of equipment mounting systems, other modifications, changes, and substitutions are intended. By way of example, other type of equipment, which are different from solar modules, may well be used in connection with the present teachings and arrangements. Accordingly, it is appropriate that the disclosure be construed broadly and in a manner consistent with the scope of the disclosure, as set forth in the following claims

What is claimed is:

1. An equipment mounting system comprising:
a mounting plate having defined therein a plate aperture of a particular shape;
a bolt having head portion and a shaft portion including a non-threaded portion that is of a complementary shape that complements said particular shape of said plate aperture;
a washer having defined therein a scored aperture that includes multiple radially extending scorings and multiple engaging portions, each engaging portion being defined between two radially extending scorings; and
wherein in an assembled configuration of said mounting plate, said bolt, and said washer, said plate aperture of said particular shape engages with said non-threaded portion of said complementary shape to prevent rotational displacement of said bolt around said mounting plate, and said multiple engaging portions of said washer engage with said shaft portion of said bolt and said head portion of said bolt contacts said mounting plate to prevent translational displacement of said bolt relative to said mounting plate.

2. The equipment mounting system of claim 1, wherein, in said assembled configuration, said multiple engaging portions protrude away from said mounting plate to provide spring loading action towards said mounting plate.

3. The equipment mounting system of claim 1, wherein two flat surfaces of said washer have applied thereon an adhesive that serves as a substantially water-proof seal, and in said assembled configuration, a first surface of said washer adheres to a second mounting plate surface.

4. The equipment installation assembly of claim 3, wherein said adhesive of a second of said two flat surfaces of said washer is designed to adhere to a sealing patch.

5. The equipment mounting system of claim 1, wherein said bolt comprises a sealing groove designed to receive a sealing ring, and in said assembled configuration, said sealing ring seals said bolt to a first mounting plate surface that extends from said plate aperture of said particular shape to a periphery of said mounting plate.

6. The equipment mounting system of claim 5, wherein in said assembled configuration, said sealing ring contacts and is compressed by presence of said first mounting plate surface.

7. The equipment mounting system of claim 1, wherein said shaft portion of said bolt further comprises a non-threaded portion of another shape and, in said assembled configuration of said mounting plate, said bolt, and said washer, said multiple engaging portions engage with said non-threaded portion of another shape to prevent translational displacement of said bolt relative to said mounting plate.

8. The equipment mounting system of claim 7, wherein, in said assembled configuration of said mounting plate, said bolt, and said washer, said multiple engaging portions engage with and are deflected by said non-threaded portion of another shape.

9. The equipment mounting system of claim 7, wherein said shaft portion of said bolt further includes a threaded portion and a diameter of said non-threaded portion of another shape is less than a major diameter of said threaded portion.

10. The equipment mounting system of claim 9, wherein a diameter of said scored aperture of said washer is less than said major diameter of said threaded portion of said bolt and less than said diameter of said non-threaded portion of another shape of said bolt.

11. A method of assembling an equipment mounting system, said method comprising:
   obtaining a mounting plate having defined therein a plate aperture of a particular shape;
   obtaining a bolt comprising:
      a head portion including an underside region, and wherein said underside region has defined therein a sealing groove that is designed to receive a sealing ring;
      a shaft portion that connects to said head portion, and said shaft portion has a threaded portion and a non-threaded portion that is of a complementary shape to said particular shape of said plate aperture;
   obtaining a washer having defined therein a scored aperture having multiple radially extending scorings and multiple engaging portions, each engaging portion being defined between two radially extending scorings;
   installing a sealing ring inside said sealing groove to form a sealing bolt;
   inserting said sealing bolt through said plate aperture such that said sealing ring contacts a first surf ace of said mounting plate and said plate aperture receives and engages with said complementary shape of said bolt to prevent rotational displacement of said sealing bolt around said mounting plate;
   engaging said scored aperture with said shaft portion of said sealing bolt; and
   applying a force to said washer until said head portion of said bolt contacts said mounting plate to prevent translational displacement of said sealing bolt relative to said mounting plate and compress said sealing ring against said first surface of said mounting plate.

12. The method of assembling said equipment mounting system of claim 11, further comprising:
   applying a first adhesive layer to a first washer surface and applying a second adhesive layer to a second washer surface; and
   adhering, using said second adhesive layer, said second washer surface to a second mounting plate surface.

13. The method of assembling said equipment mounting system of claim 11, wherein said applying said force further comprises:
   deflecting a portion of a second washer surface in an opposing direction of said multiple engaging portions;
   generating, using said deflecting, a deflecting force or spring force between said second washer surf ace and a second mounting plate surface; and
   pulling, using said deflecting force or said spring force, said head portion towards said first mounting plate surface.

14. The method of assembling said equipment mounting system of claim 11, wherein said obtaining said bolt further comprises a non-threaded portion of another shape and said applying said force further comprises engaging said multiple engaging portions with said non-threaded portion of another shape to prevent translational movement of said bolt relative to said mounting plate.

* * * * *